United States Patent
Ochi et al.

(10) Patent No.: US 11,506,257 B2
(45) Date of Patent: Nov. 22, 2022

(54) TRANSMISSION BELT ELEMENT AND TRANSMISSION BELT

(71) Applicant: AISIN CORPORATION, Kariya (JP)

(72) Inventors: Akira Ochi, Aichi (JP); Takayuki Miyake, Aichi (JP)

(73) Assignee: AISIN CORPORATION, Kariya (JP)

( * ) Notice: Subject to any disclaimer, the term of this patent is extended or adjusted under 35 U.S.C. 154(b) by 122 days.

(21) Appl. No.: 16/619,603

(22) PCT Filed: Aug. 1, 2018

(86) PCT No.: PCT/JP2018/028908
§ 371 (c)(1),
(2) Date: Dec. 5, 2019

(87) PCT Pub. No.: WO2019/035360
PCT Pub. Date: Feb. 21, 2019

(65) Prior Publication Data
US 2020/0149610 A1    May 14, 2020

(30) Foreign Application Priority Data
Aug. 14, 2017  (JP) .............................. JP2017-156449

(51) Int. Cl.
F16G 5/16    (2006.01)
F16G 5/00    (2006.01)
F16H 9/04    (2006.01)

(52) U.S. Cl.
CPC ................ *F16G 5/16* (2013.01); *F16G 5/00* (2013.01); *F16H 9/04* (2013.01)

(58) Field of Classification Search
CPC ..... F16G 5/00; F16G 5/16; F16G 5/18; F16G 5/166; F16G 1/00; F16G 1/22; F16G 1/24
See application file for complete search history.

(56) References Cited

U.S. PATENT DOCUMENTS 4,365,965 A * 12/1982 Russ, Sr. ................. F16G 5/166
                                                        474/244
4,465,469 A *  8/1984 Cataldo ..................... F16G 5/16
                                                        474/201
(Continued)

FOREIGN PATENT DOCUMENTS

JP       2003-056649 A      2/2003
JP       2006-153089 A      6/2006
JP       2018048716 A  *    3/2018

OTHER PUBLICATIONS

JP2006153089A Translation; Harada et al; Belt for a continuously Variable Transmission; Published: Jun. 15, 2006; Published By: Espacenet (Year: 2006).*

(Continued)

*Primary Examiner* — Michael R Mansen
*Assistant Examiner* — Raveen J Dias
(74) *Attorney, Agent, or Firm* — Sughrue Mion, PLLC

(57) ABSTRACT

An element of a transmission including: a rocking edge portion with a convex surface formed on one of a front face and a rear face, so that the rocking edge portion extends over a pillar portion at least partially, the rocking edge portion having a contact line where the adjacent elements contact each other serves as a fulcrum of rotation of the adjacent elements; and a recessed non-contact portion extends along the saddle surface, to avoid contact with the adjacent element, and that divides the rocking edge portion in the width direction at least partially. A depth of the non-contact portion is set so that an end portion of the non-contact portion is positioned on an inner peripheral side of the transmission belt relative to the contact line when a winding radius is minimized, and the end portion does not reach the trunk portion on the inner peripheral side.

7 Claims, 4 Drawing Sheets

(56) References Cited

U.S. PATENT DOCUMENTS

| | | | | |
|---|---|---|---|---|
| 5,123,880 | A * | 6/1992 | Sekine | F16H 9/24 474/244 |
| 6,409,620 | B1 * | 6/2002 | Yoshida | F16G 5/16 474/201 |
| 8,187,129 | B2 * | 5/2012 | Kobayashi | F16G 5/16 474/242 |
| 2002/0137585 | A1 * | 9/2002 | Smeets | F16G 5/163 474/242 |
| 2004/0053723 | A1 * | 3/2004 | Smeets | F16G 5/163 474/242 |
| 2004/0082417 | A1 * | 4/2004 | Smeets | F16G 5/16 474/242 |
| 2011/0201467 | A1 * | 8/2011 | Kobayashi | F16G 5/16 474/240 |
| 2012/0190490 | A1 * | 7/2012 | Morino | F16G 5/16 474/240 |
| 2016/0102732 | A1 * | 4/2016 | Yagasaki | F16G 5/16 474/242 |
| 2018/0023664 | A1 * | 1/2018 | Bransma | F16G 5/18 474/8 |
| 2019/0032750 | A1 * | 1/2019 | Brandsma | F16G 5/16 |
| 2019/0101185 | A1 * | 4/2019 | Ninomiya | F16G 5/16 |
| 2019/0101186 | A1 * | 4/2019 | Ninomiya | F16G 5/16 |
| 2019/0101187 | A1 * | 4/2019 | Ninomiya | F16G 5/16 |
| 2019/0154113 | A1 * | 5/2019 | Sato | F16G 5/16 |
| 2019/0195315 | A1 * | 6/2019 | Ochi | F16G 5/16 |
| 2019/0234486 | A1 * | 8/2019 | Inase | F16G 5/16 |
| 2019/0346016 | A1 * | 11/2019 | Van Treijen | F16G 5/16 |
| 2020/0011398 | A1 * | 1/2020 | Nakamura | F16G 5/16 |
| 2020/0103000 | A1 * | 4/2020 | Takahashi | F16H 9/12 |
| 2020/0132160 | A1 * | 4/2020 | Inase | F16G 5/16 |
| 2020/0300335 | A1 * | 9/2020 | Ochi | B21D 53/14 |
| 2021/0148439 | A1 * | 5/2021 | Miyake | F16G 5/16 |

OTHER PUBLICATIONS

International Search Report for PCT/JP2018/028908 dated Nov. 6, 2018 [PCT/ISA/210].

* cited by examiner

TRANSMISSION BELT ELEMENT AND TRANSMISSION BELT

CROSS REFERENCE TO RELATED APPLICATIONS

This application is a National Stage of International Application No. PCT/JP2018/028908, filed Aug. 1, 2018, claiming priority to Japanese Patent Application No. 2017-156449, filed Aug. 14, 2017.

TECHNICAL FIELD

The disclosure relates to a transmission belt element and a transmission belt provided with the transmission belt element. Here, the transmission belt element includes a trunk portion having a saddle surface that is in contact with a ring of the transmission belt that is wound around a pulley of a continuously variable transmission, and a pair of pillar portions extending from the trunk portion so as to be positioned on both sides of the saddle surface in a width direction.

BACKGROUND ART

Conventionally, a transmission belt element including a body portion extending toward the left and right, a pair of pillar portions extending upward from left and right ends of an upper region of the body portion, and a rocking edge portion formed on a front side main surface and extending toward the left and right is known (for example, see Patent Document 1). An inclined surface is formed on the front side main surface of the element so as to be positioned on a lower region of the rocking edge portion extending toward the left and right. A plate thickness of the element becomes thinner as it extends toward a lower end. A recessed portion (non-contact portion) extending upward and downward is formed on a generally central portion in the left and right direction of the element on the front side main surface or a rear side main surface. In this way, in the transmission belt including the element, the adjacent elements are brought into contact with each other on both sides across the recessed portion so as to absorb misalignment and suppress yawing.

RELATED ART DOCUMENTS

Patent Documents

[Patent Document 1] Japanese Unexamined Patent Application Publication No. 2006-153089 (JP 2006-153089 A)

SUMMARY OF THE DISCLOSURE

However, in the element described in the above Patent Document 1, the strength is decreased due to the recessed portion that extends to the lower end (lower edge portion) of the element being formed on the front side main surface or the rear side main surface. There is a possibility that the durability of the transmission belt including a plurality of the elements is decreased resulting from the decrease in the strength of the element itself and the deformation of the element while a torque is being transmitted.

An aspect of the disclosure is to make sure that a transmission belt element is in contact with an adjacent element only at a rocking edge portion that is positioned on both sides across a non-contact portion, and also sufficiently ensure the strength of the transmission belt element so as to further improve the durability of a transmission belt.

The transmission belt element of the disclosure is a transmission belt element that includes: a trunk portion having a saddle surface that is in contact with a ring of a transmission belt that is wound around a primary pulley and a secondary pulley of a continuously variable transmission; and a pair of pillar portions extending from the trunk portion so as to be positioned on both sides of the saddle surface in a width direction. The transmission belt element includes: a rocking edge portion with a convex surface that is formed on one of a front face and a rear face, so that the rocking edge portion is extended over the pillar portion at least partially, the rocking edge portion having a contact line on which the adjacent elements contact with each other and which serves as a fulcrum of rotation of the adjacent elements; and a non-contact portion that is a recessed portion extended along the saddle surface in the width direction, so as not to be in contact with the adjacent element, and that divides the rocking edge portion in the width direction at least partially. A depth of the non-contact portion is set so that an end portion of the non-contact portion on an inner peripheral side of the transmission belt is positioned on the inner peripheral side relative to the contact line when a winding radius of the transmission belt is minimized, and so that the end portion does not reach an edge portion of the trunk portion on the inner peripheral side.

In the transmission belt element of the disclosure, the rocking edge portion is at least partially divided in the width direction by the non-contact portion. The depth of the non-contact portion is set so that the end portion of the non-contact portion on the inner peripheral side of the transmission belt is positioned on the inner peripheral side relative to the contact line when the winding radius of the transmission belt is minimized, and so that the end portion does not reach the edge portion of the trunk portion on the inner peripheral side. In this way, it is possible to make sure that the transmission belt element is in contact with the adjacent element only at the rocking edge portion that is positioned on both sides across the non-contact portion, and suppress the transmission belt element from being formed thinner. It is thus possible to sufficiently ensure the strength of the transmission belt element and suppress deformation of the transmission belt element while a torque is being transmitted. As a result, the durability of the transmission belt including the transmission belt element of the disclosure can be further improved.

DETAILED DESCRIPTION

Modes for carrying out the various aspects of the disclosure will be described below with reference to the drawings.

Figure 1:
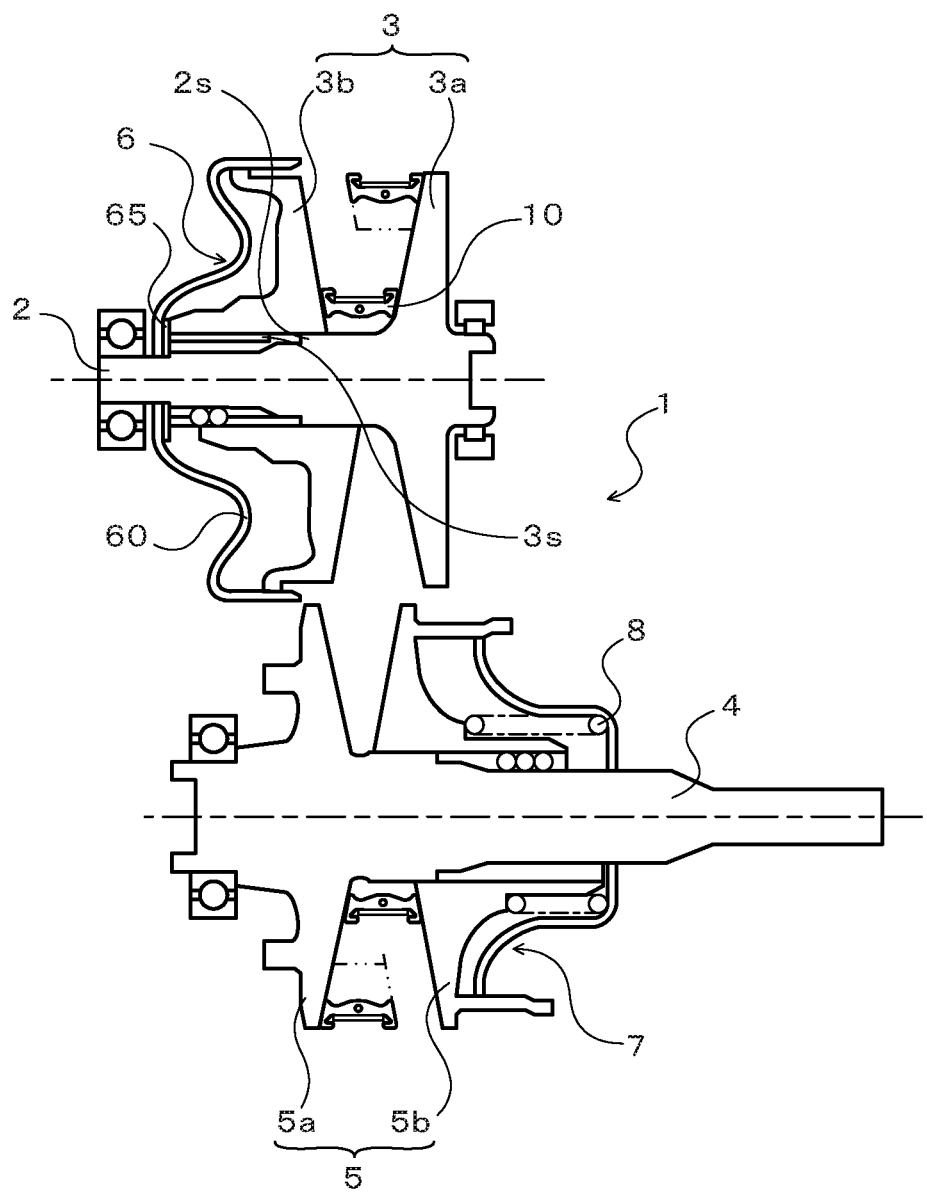
FIG. 1 is a schematic configuration diagram of an example of a continuously variable transmission including a transmission belt having a transmission belt element of the disclosure.

FIG. 1 is a schematic configuration diagram of a continuously variable transmission (CVT) 1 of the disclosure. The continuously variable transmission 1 illustrated in FIG. 1 is installed in a vehicle and includes: a primary shaft (first shaft) 2 that serves as a driving rotary shaft; a primary pulley (first pulley) 3 disposed in the primary shaft 2; a secondary shaft (second shaft) 4 serving as a driven rotary shaft and disposed on parallel with the primary shaft 2; a secondary pulley (second pulley) 5 disposed in the secondary shaft 4; and a transmission belt 10. As shown in the figure, the transmission belt 10 is wound around a pulley groove (V-shaped groove) of the primary pulley 3 and a pulley groove (V-shaped groove) of the secondary pulley 5.

The primary shaft 2 is coupled to an input shaft (not shown) via a front/reverse switching mechanism not shown. The input shaft is coupled to a power generation source such as an engine (internal combustion engine) of the vehicle. The primary pulley 3 includes a fixed sheave 3a formed integrally with the primary shaft 2, and a movable sheave 3b supported by the primary shaft 2 via a ball spline etc. so as to be slidable in an axial direction. The secondary pulley 5 includes a fixed sheave 5a formed integrally with the secondary shaft 4, and a movable sheave 5b supported by the secondary shaft 4 via a ball spline etc. so as to be slidable in the axial direction and urged in the axial direction by a return spring 8.

The continuously variable transmission 1 includes a primary cylinder 6 that is a hydraulic actuator that changes a width of a groove of the primary pulley 3, and a secondary cylinder 7 that is a hydraulic actuator that changes a width of a groove of the secondary pulley 5. The primary cylinder 6 is formed behind the movable sheave 3b of the primary pulley 3. The secondary cylinder 7 is formed behind the movable sheave 5b of the secondary pulley 5. Working oil is supplied from a hydraulic control device that is not shown to the primary cylinder 6 and the secondary cylinder 7 in order to change the width of the grooves of the primary pulley 3 and the secondary pulley 5. The secondary shaft 4 is coupled to driving wheels of the vehicle via a gear mechanism, a differential gear, and a drive shaft (all not shown).

In the embodiment, a step portion is formed on an end portion (end portion on left side in FIG. 1) on the opposite side of the primary shaft 2 from the engine side. An annular end plate 65 is interposed between the step portion and the primary piston 60 of the primary cylinder 6 so that the end plate 65 can abut against the end portion (end portion on left side in FIG. 1) on the opposite side of the movable sheave 3b of the primary pulley 3 from the engine side. A stopper portion 2s is formed in the primary shaft 2 so that the stopper portion 2s can abut against an end portion on the fixed sheave 3a side of a spline tooth 3s formed on an inner peripheral surface of the movable sheave 3b.

When the movable sheave 3b of the primary pulley 3 is spaced away from the fixed sheave 3a and is abutted against the end plate 65, movement of the movable sheave 3b in a direction away from the fixed sheave 3a with respect to the primary shaft 2 is restricted. In this way, the width of the pulley groove of the primary pulley 3 is maximized and consequently the width of the pulley groove of the secondary pulley 5 is set to the minimum, and a speed ratio γ of the continuously variable transmission 1 is maximized. When the spline tooth 3s formed on the inner peripheral surface of the movable sheave 3b abuts against the stopper portion 2s formed in the primary shaft 2, movement of the movable sheave 3b in a direction toward the fixed sheave 3a with respect to the primary shaft 2 is restricted. In this way, the width of the pulley groove of the primary pulley 3 is minimized and consequently the width of the pulley groove of the secondary pulley 5 is set to the maximum with the transmission belt 10, and the speed ratio γ of the continuously variable transmission 1 is minimized. The continuously variable transmission 1 may be configured so that the primary shaft 2 and the secondary shaft 4 are selectively coupled to the input shaft and the primary shaft 2 and the secondary shaft 4 are selectively coupled to the drive shaft of the vehicle.

Figure 2:
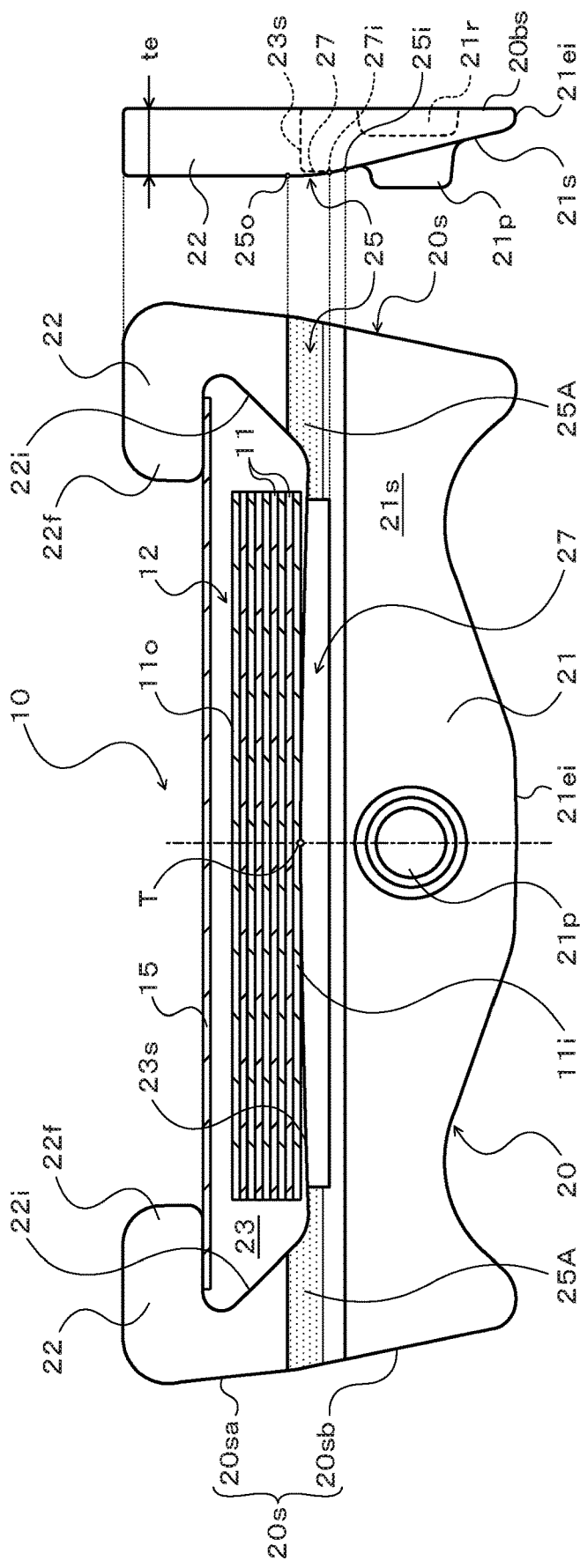
FIG. 2 is a schematic configuration diagram of the transmission belt element of the disclosure.

FIG. 2 is a schematic configuration diagram of the transmission belt 10. As illustrated in FIG. 2, the transmission belt 10 includes a laminated ring 12 configured by laminating a plurality of (for example, nine in the embodiment) elastically deformable ring materials 11 in a thickness direction (ring radial direction), a retainer ring 15, and a plurality of (for example, several hundred) elements 20 annularly arranged (bound) along an inner peripheral surface of the laminated ring 12. In the embodiment, the element 20 includes a first element, and a second element that has a thickness (maximum thickness) that is slightly thicker (for example, by around 0.1 mm) than that of the first element. A plurality of the first and second elements are arranged side by side. It is thus possible to suppress vibration and noise from being generated when a torque is transmitted between the primary pulley 3 and the secondary pulley 5 with the transmission belt 10. Since the first and second elements have common structures except for their thickness, hereinafter, the first and second elements will be described by being collectively called the "elements 20".

A plurality of the ring materials 11 that configure the laminated ring 12 are elastically deformable ring materials 11 that are cut out from a drum made of a steel plate. The ring materials 11 are machined so as to have substantially the same thickness and different circumferences that are prescribed for each one. The retainer ring 15 is an elastically deformable ring that is cut out from a drum made of a steel plate for example, and has a thickness that is substantially the same as or thinner than that of the ring materials 11. The retainer ring 15 has an inner circumference that is longer than an outer circumference of an outermost layer ring material 11o of the laminated ring 12. In this way, when the laminated ring 12 and the retainer ring 15 are disposed concentrically (non-load state in which tensile force is not applied), an annular clearance is formed between an outer peripheral surface of the outermost layer ring material 11o and an inner peripheral surface of the retainer ring 15, as illustrated in FIG. 2.

Each element 20 has a symmetrical outer shape (planar shape) punched out from a steel plate by press working. As illustrated in FIG. 2, the element 20 includes a trunk portion 21 extending horizontally in the drawing, a pair of pillar portions 22 extending from both sides of the trunk portion 21 in the same direction, and a single ring housing portion (recessed portion) 23 that is defined between the pillar portions 22 so as to open toward a free end side of each pillar portion 22. The element 20 also includes a pair of side faces 20s that are formed so as to be spaced away from each other as the side faces 20s extend from an inner peripheral side to an outer peripheral side (radially outward of the laminated ring 12) of the transmission belt 10 (laminated ring 12).

The pillar portions 22 extend from both sides of the saddle surface 23s in the width direction toward the outer peripheral side (a direction from the inner peripheral side toward the outer peripheral side of the transmission belt 10 (laminated ring 12), that is, upward in the drawing). The saddle surface 23s is a bottom surface of the ring housing portion 23. A hook portion 22f that protrudes in the width direction of the saddle surface 23s is formed on a free end portion of each pillar portion 22. A pair of the hook portions 22f face each other while being spaced away from each other at an interval that is slightly longer than the width of the laminated ring 12 (ring material 11) and that is shorter than the width of the retainer ring 15. Each pillar portion 22 of the element 20 includes a flat inner surface 22i that is inclined so as to be spaced away from the saddle surface 23s as it extends toward the outer peripheral side. Between the saddle surface 23s and the inner surface 22i of the pillar portion 22, a concave surface (for example, a concave cylindrical surface) that is smoothly continuous with the saddle surface 23s and the inner surface 22i is formed.

As illustrated in FIG. 2, the laminated ring 12 is disposed in the ring housing portion 23 and the saddle surface 23s of the ring housing portion 23 is in contact with the laminated ring 12, that is, an inner peripheral surface of an innermost layer ring material 11i. The saddle surface 23s has a symmetrical convex surface shape (crowned shape) that is gradually inclined downward in the figure as it extends toward the outer side in the width direction with a central portion in the width direction serving as a top portion T. In this way, it is possible to center the laminated ring 12 by applying a centripetal force towards the top portion T to the laminated ring 12 by friction with the saddle surface 23s. However, the saddle surface 23s may include a plurality of convex surfaces that are curved outward in a radial direction of the laminated ring 12.

The retainer ring 15 that is elastically deformed is fitted in the ring housing portion 23 between the hook portions 22f of each element 20. The retainer ring 15 is disposed between the outer peripheral surface of the outermost layer ring material 11o of the laminated ring 12 and the hook portions 22f of the element 20 so as to surround the laminated ring 12. With the pillar portions 22, the retainer ring 15 restricts the element 20 from falling out of the laminated ring 12 and restricts the laminated ring 12 from falling out of the element 20. The elements 20 are thus annularly bound (arranged) along the inner peripheral surface of the laminated ring 12. In the embodiment, a single or a plurality of openings (long holes) not shown are formed in the retainer ring 15. In this way, it is possible to make the retainer ring 15 easily elastically deformable and ensure an assembling property of the retainer ring 15 to the elements 20.

As described above, the clearance is formed between the outer peripheral surface of the outermost layer ring material 11o of the laminated ring 12 and the inner peripheral surface of the retainer ring 15. Thus, a tensile force etc. basically does not act on the retainer ring 15 while the continuously variable transmission 1 is being operated. In the element 20, there is no need to make the pillar portion 22 and the hook portion 22f large so as to ensure rigidity etc. It is possible to reduce an area of a part of the pillar portion 22 that protrudes toward the outer peripheral side relative to the laminated ring 12, compared to a conventional element in which laminated rings are disposed on both sides of a head portion extending from a center portion of a trunk portion in a width direction toward an outer peripheral side. With the reduction in the cost of the materials of the element 20, the cost of the transmission belt 10 and also the continuously variable transmission 1 can be reduced.

Each side face 20s of the element 20 includes a first side face 20sa positioned on the pillar portion 22 side, that is, the opposite side (outer side) of the pillar portion 22 from the inner surface 22i, and a second side face 20sb formed so as to be continuous with the first side face 20sa and positioned on the inner peripheral side of the first side face 20sa (inner side in the radial direction of the laminated ring 12). In the embodiment, the pair of first side faces 20sa are formed so as to be spaced away from each other as they extend toward the outer peripheral side, similar to the second side faces 20sb. It is thus possible to satisfactorily ensure the strength of the pillar portion 22.

An angle formed by a pair of the second side faces 20sb is set to be nearly equal to an opening angle of the pulley groove of the primary pulley 3 and the secondary pulley 5 (slightly larger than a set value of the opening angle, in the embodiment). An angle formed by a pair of the first side faces 20sa is set to be smaller than the angle formed by the second side faces 20sb. The second side faces 20sb of the element 20 are in frictional contact with the surface of the pulley groove of the primary pulley 3 and the pulley groove of the secondary pulley 5, receive a holding force from the pulleys 3, 5, and become torque transmitting faces (flank faces) that transmit a torque from the primary pulley 3 to the secondary pulley 5 with friction. In contrast, the first side faces 20sa are basically not in contact with the surface of the pulley groove, when a torque is transmitted from the primary pulley 3 to the secondary pulley 5 with the transmission belt 10. On the surface of each second side face 20sb, recesses and projections (a plurality of grooves) not shown are formed, in which the recesses and the projections are for holding hydraulic oil for lubricating and cooling a contact portion of the element 20 and the primary pulley 3 or the secondary pulley 5.

As illustrated in FIG. 2, a front face (one face) of the element 20 includes a rocking edge portion (contact region) 25 with a convex surface shape, a non-contact portion 27, and a tapered surface (inclined surface) 21s formed on the trunk portion 21. The rocking edge portion 25 is a convex surface portion formed on the front face of the element 20 so as to be extended over the pillar portion 22 and the trunk portion 21. The rocking edge portion 25 is in line contact with a rear face 20bs of the adjacent element 20. That is, the rocking edge portion 25 includes a contact line on which the adjacent elements 20 contact with each other and which serves as a fulcrum of rotation of the adjacent elements 20.

Figure 3:
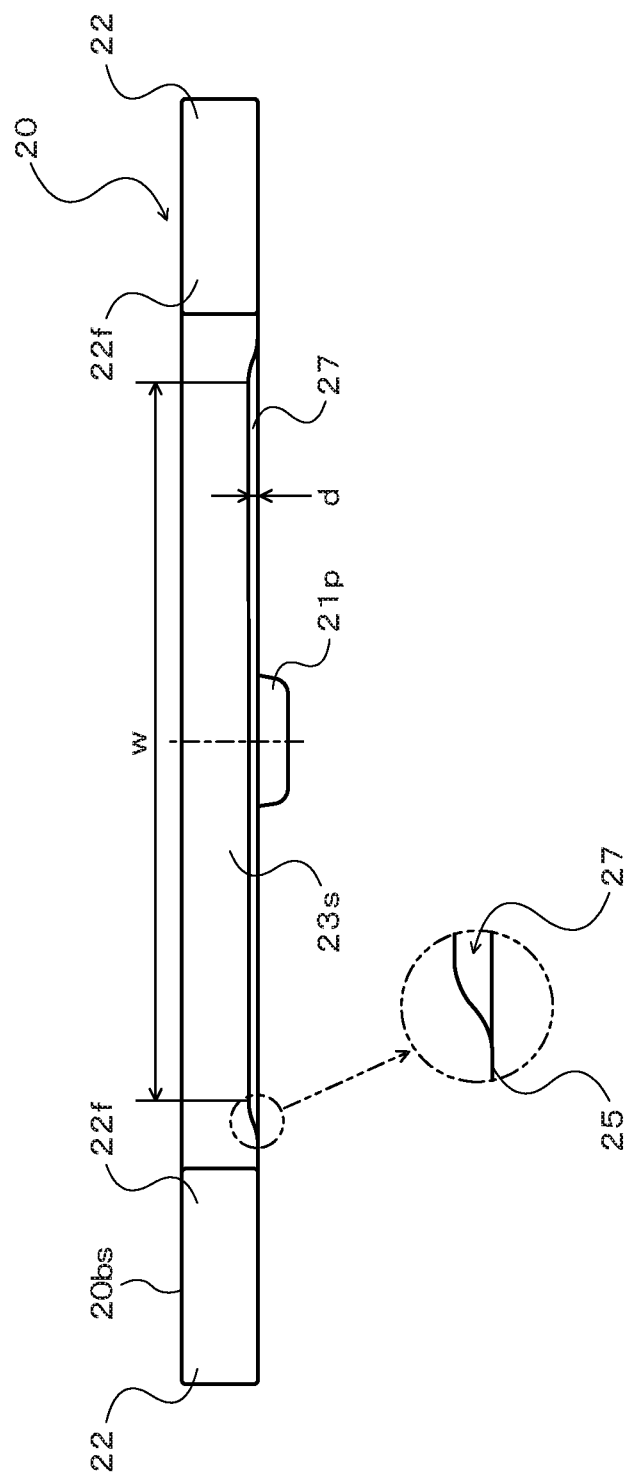
FIG. 3 is a schematic configuration diagram of the transmission belt element of the disclosure.

The non-contact portion 27 is a belt shaped recessed portion that is formed on the trunk portion 21 so as to open toward the saddle surface 23s and extend along the saddle surface 23s in the width direction. The non-contact portion 27 partially divides the rocking edge portion 25 in the width direction. As illustrated in FIG. 3, the non-contact portion 27 is formed so that the depth of both end portions in the width direction are gradually decreased as the non-contact portion 27 narrows toward the rocking edge portion 25, and a portion between both end portions has a generally constant depth d. A width w of the portion of the non-contact portion 27 that has the generally constant depth d is smaller than a width of the laminated ring 12. In this way, it is possible to suppress stress concentration near both end portions of the non-contact portion 27 in the width direction and further improve the durability of the element 20.

The tapered surface 21s is a flat inclined surface that is continuous with the rocking edge portion 25 and that is formed so as to narrow toward the rear face 20bs of the element 20 as the tapered surface 21s extends from the rocking edge portion toward an edge portion 21ei (lower side in the figure) of the trunk portion 21 on the inner peripheral side of the transmission belt 10. On the tapered surface 21s, a protrusion (dimple) 21p is formed so as to be positioned on the central portion of the front face of the trunk portion 21 in the width direction. On the rear face 20bs of the element 20 (trunk portion 21), a recessed portion 21r is formed so as to be positioned on the rear side of the protrusion 21p. When the transmission belt 10 is assembled, the protrusion 21p of the adjacent element 20 is loosely fitted in the recessed portion 21r.

In the embodiment, the front face of the element 20 (mainly the front face of the pillar portion 22) on the outer peripheral side of the rocking edge portion 25 (upper side in FIG. 2) and the rear face 20bs (other face) of the element 20 are formed to be flat and in parallel with each other, as illustrated in FIG. 2. The pillar portion 22 of the element 20 has a generally constant thickness te. The non-contact portion 27 is recessed to the rear face 20bs side with respect to the surface of the rocking edge portion 25. Thus, the thickness of the saddle surface 23s is less than the thickness te of the pillar portion 22. An inclination angle of the tapered surface 21s is set while taking into consideration the thickness te of the pillar portion 22 so that the tapered surface 21s is not in contact with the rear face 20bs of the adjacent element 20. A planar portion extending in parallel to the rear face 20bs of the element 20 may be formed around the protrusion 21p.

Figure 4:
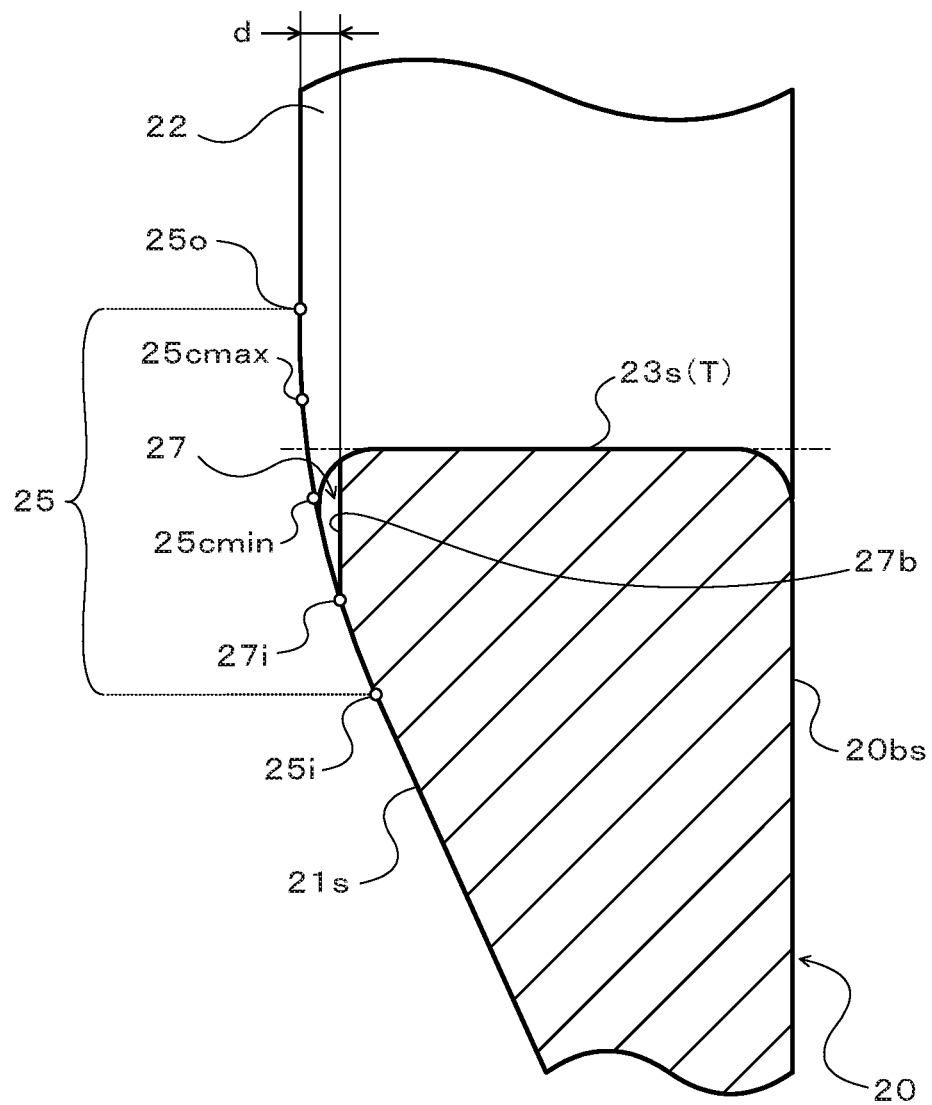
FIG. 4 is a partially enlarged sectional view of a main part of the transmission belt element of the disclosure.

FIG. 4 is a partially enlarged sectional view of a main part of the element 20. As illustrated in FIG. 4, the rocking edge portion 25 is formed so as to be smoothly continuous with the front face of the pillar portion 22 and the tapered surface 21s and has a width in the radial direction of the transmission belt 10. In the embodiment, the rocking edge portion 25 is formed of a cylindrical surface that has a predetermined curvature radius and that is tangent to both the front face of the pillar portion 22 and the tapered surface 21s. However, the rocking edge portion 25 may be formed of a convex surface besides the cylindrical surface, such as an elliptical cylindrical surface.

As described above, the rocking edge portion 25 includes the contact line which serves as the fulcrum of rotation of the adjacent elements 20. The position of the contact line varies within a range, based on a speed ratio γ of the continuously variable transmission 1. Here, the range is from an end portion (hereinafter referred to as an "outer peripheral side end portion") 25o of the rocking edge portion 25 on the outer peripheral side of the transmission belt 10 to an end portion (hereinafter referred to as an "inner peripheral side end portion") 25i of the rocking edge portion 25 on the inner peripheral side of the transmission belt 10. That is, when a torque is transmitted from the primary pulley 3 to the secondary pulley 5 with the transmission belt 10 including the elements 20, the contact line of the adjacent elements 20 in a chord portion is positioned on the outermost peripheral side of the transmission belt 10 within the rocking edge portion 25. Here, the chord portion is a portion that is not wound around the pulleys 3, 5 of the transmission belt 10. When the winding radius of the transmission belt 10 is minimized, in theory, the contact line of the adjacent elements 20 is positioned on the innermost peripheral side of the transmission belt 10 within the rocking edge portion 25. This is due to the inclination of the element 20 being the largest at that time.

The rocking edge portion 25 (the curvature radius of the cylindrical surface described above etc.) is thus designed so that the outer peripheral side end portion 25o (the boundary between the front face of the pillar portion 22 and the rocking edge portion 25) is positioned on the outer peripheral side relative to a design (theoretical) contact line in the above chord portion. The rocking edge portion 25 is designed so that the inner peripheral side end portion 25i (the boundary between the tapered surface 21s and the rocking edge portion 25) is positioned on the inner peripheral side relative to a contact line 25cmin when the winding radius of the transmission belt 10 is minimized. The rocking edge portion 25 is thus continuous with the tapered surface 21s on the inner peripheral side relative to the contact line 25cmin. In the embodiment, the rocking edge portion 25 is designed so that the inner peripheral side end portion 25i is spaced away sufficiently (to a certain degree) from the contact line 25cmin toward the inner peripheral side, as illustrated, in consideration of a manufacturing tolerance of the element 20 etc. and a deformation amount during operation etc.

A contact line 25max when the winding radius of the transmission belt 10 is maximized is included within the range from the outer peripheral side end portion 25o to the contact line 25cmin of the rocking edge portion 25. In the embodiment, the rocking edge portion 25 is designed so that the contact line 25cmin when the winding radius is minimized is positioned on the inner peripheral side relative to the saddle surface 23s (bottom portion) and the contact line 25cmax when the winding radius is maximized is positioned on the outer peripheral side relative to the saddle surface 23s (top portion T). In this way, it is possible to further shorten the distance between the saddle surface 23s and the contact line of the elements 20 in the radial direction of the transmission belt 10 that is wound around the pulleys 3, 5 while a torque is being transmitted. Thus, it is possible to further decrease the angular velocity difference between the laminated ring 12 and the element 20, and satisfactorily decrease the frictional loss resulting from a relative slip between the laminated ring 12 and the element 20. The winding radius of the transmission belt 10 is minimized when the speed ratio γ of the continuously variable transmission 1 is minimized, and the winding radius is maximized when the speed ratio γ is maximized. In another case, the winding radius of the transmission belt 10 is minimized when the speed ratio γ is maximized, and the winding radius is maximized when the speed ratio γ is minimized.

Here, the non-contact portion 27 that is a recessed portion extended along the saddle surface 23s is formed on each element 20 as described above. Thus, in the transmission belt 10, it is possible to suppress contact with the adjacent element 20 in parts other than the rocking edge portion 25 and improve the durability of each element 20. That is, the element 20 is suppressed from being in contact with the non-contact portion 27 of the adjacent element 20. It is thus possible to suppress a load from the central portion in the width direction of the element 20 on which a large moment acts from being applied to the adjacent element 20 and suppress the adjacent element 20 from being deformed. It is therefore possible to improve the durability of each element 20.

Suppose the end portion of the non-contact portion 27 on the inner peripheral side of the transmission belt 10 is positioned on the outer peripheral side relative to the contact line 25cmin described above. In such a case, there is a possibility that the element 20 is in contact with a portion of the adjacent element 20 on the inner peripheral side relative to the non-contact portion 27 when the winding radius of the transmission belt 10 is minimized. When the non-contact portion 27 is formed on the front face of the element 20 so as to reach the edge portion 21ei on the inner peripheral side of the trunk portion 21, there is a possibility that the strength of the element 20 is decreased and the durability of the transmission belt 10 including the elements 20 is decreased.

With this in mind, the depth (the constant depth described above) d of the non-contact portion 27 of the element 20 is set, as illustrated in FIG. 4. The depth d is set so that an end portion (hereinafter referred to as an "inner peripheral side end portion") 27*i* of the non-contact portion 27 on the inner peripheral side of the transmission belt 10 is positioned on the inner peripheral side relative to the contact line 25*cmin* when the winding radius of the transmission belt 10 is minimized. The depth d is set so that inner peripheral side end portion 27*i* is also positioned closer to the outer peripheral side than the inner peripheral side end portion 25*i* (the boundary between the tapered surface 21*s* and the rocking edge portion 25) of the rocking edge portion 25. That is, a bottom surface 27*b* of the non-contact portion 27 is closer the rear face 20*bs* of the element 20 than the contact line 25*cmin* and is spaced further away from the rear face 20*bs* than the inner peripheral side end portion 25*i* of the rocking edge portion 25.

In this way, it is possible to divide the rocking edge portion 25 into a pair of actual contact regions 25A (regions in which a portion positioned on the inner peripheral side relative to the contact line 25*cmin* described above is mainly excluded from the rocking edge portion 25, see portion with half-tone dot meshing in FIG. 2) with the non-contact portion 27, so that the element 20 is in contact with the adjacent element 20 only at the rocking edge portion 25 positioned on both sides across the non-contact portion 27. It is also possible to make the depth of the non-contact portion 27 as small as possible and satisfactorily suppress the element 20 from being formed thin. As a result, the strength of each element 20 can be sufficiently ensured and deformation of the element 20 while a torque is being transmitted can be suppressed. It is thus possible to further improve the durability of the transmission belt 10 including the elements 20.

As described above, the rocking edge portion 25 of the element 20 is designed so that the contact line 25*cmin* when the winding radius is minimized is positioned on the inner peripheral side relative to the saddle surface 23*s* and the contact line 25*cmax* when the winding radius is maximized is positioned on the outer peripheral side relative to the saddle surface 23*s*. In the element 20, the inner peripheral side end portion 27*i* of the non-contact portion 27 is positioned on the outer peripheral side relative to the inner peripheral side end portion 25*i* of the rocking edge portion 25. It is thus possible to make the depth of the non-contact portion 27 smaller, compared to when the contact line 25*cmax* when the winding radius is maximized is provided on the inner peripheral side relative to the saddle surface 23*s* in the radial direction of the transmission belt 10, for example.

Depending on the specifications (thickness etc.) of the element 20, the depth d of the non-contact portion 27 may be set so that the inner peripheral side end portion 27*i* is positioned on the inner peripheral side end portion 25*i* (boundary between the tapered surface 21*s* and the rocking edge portion 25) of the rocking edge portion 25. Depending on the curvature of the rocking edge portion 25 and the inclination angle of the tapered surface 21*s*, the depth d of the non-contact portion 27 may be set so that the inner peripheral side end portion 27*i* is positioned closer to the inner peripheral side than the inner peripheral side end portion 25*i* of the rocking edge portion 25 within a range in which the inner peripheral side end portion 27*i* does not reach the edge portion 21*ei* on the inner peripheral side of the trunk portion 21.

Suppose the inner peripheral side end portion 25*i* of the rocking edge portion 25 is positioned on the inner peripheral side relative to the saddle surface 23*s* (bottom portion) and the outer peripheral side end portion 25*o* is positioned on the outer peripheral side relative to the saddle surface 23*s* (top portion T). In such a case, the contact line 25*cmin* when the winding radius is minimized may be positioned on the outer peripheral side relative to the saddle surface 23*s* (bottom surface). In the same case, the contact line 25*cmax* when the winding radius is maximized may be positioned on the inner peripheral side relative to the saddle surface 23*s* (top portion T). The rocking edge portion 25 may be formed so that the inner peripheral side end portion 2*i* or the outer peripheral side end portion 25*o* overlaps with a straight line (see a long dashed short dashed line in FIG. 4) extending in the width direction through the rocking edge portion 25 and the top portion T of the saddle surface 23*s*. The rocking edge portion 25 and the non-contact portion 27 may be formed on the rear face 20*bs* of the element 20.

As described above, a transmission belt element of the disclosure is a transmission belt element (20) including a trunk portion (21) having a saddle surface (23*s*) that is in contact with a ring (12) of a transmission belt (10) that is wound around a primary pulley (3) and a secondary pulley (5) of a continuously variable transmission (1), and a pair of pillar portions (22) extending from the trunk portion (21) so as to be positioned on both sides of the saddle surface (23*s*) in a width direction. The transmission belt element (20) includes a rocking edge portion (25) with a convex surface that is formed on one of a front face and a rear face, so that the rocking edge portion (25) is extended over the pillar portion (22) at least partially, the rocking edge portion (25) having contact line on which the adjacent transmission belt elements (20) contact with each other and which serves as a fulcrum of rotation of the adjacent transmission belt elements (20). The transmission belt element (20) also includes a non-contact portion (27) that is a recessed portion extended along the saddle surface (23*s*) in the width direction so as not to be in contact with the adjacent transmission belt element (20), and that divides the rocking edge portion (25) in the width direction at least partially. A depth (d) of the non-contact portion (27) is set so that an end portion (27*i*) of the non-contact portion (27) on an inner peripheral side of the transmission belt (10) is positioned on the inner peripheral side relative to the contact line (25*cmin*) when a winding radius of the transmission belt (10) is minimized, and so that the end portion (27*i*) does not reach an edge portion (21*ei*) of the trunk portion (21) on the inner peripheral side.

In the transmission belt element of the disclosure, the rocking edge portion is at least partially divided in the width direction by the non-contact portion. The depth of the non-contact portion is set so that the end portion of the non-contact portion on the inner peripheral side relative to the transmission belt is positioned on the inner peripheral side relative to the contact line when the winding radius of the transmission belt is minimized, and so that the end portion does not reach the edge portion of the trunk portion on the inner peripheral side. In this way, it is possible to make sure that the transmission belt element is in contact with the adjacent element only at the rocking edge portion that is positioned on both sides across the non-contact portion, and suppress the transmission belt element from being formed thinner. It is thus possible to sufficiently ensure the strength of the transmission belt element and suppress deformation of the transmission belt element while a torque is being transmitted. As a result, the durability of the transmission belt including the transmission belt element of the disclosure can be further improved.

The one of the front face and the rear face may include an inclined surface (21*s*) that is continuous with the rocking edge portion (25) on the inner peripheral side relative to the contact line (2cmin) when the winding radius is minimized, and that narrows toward the other one (20bs) of the front face and the rear face as the inclined surface (21s) extends toward the inner peripheral side from the rocking edge portion (25). The depth (d) of the non-contact portion (27) may be set so that an end portion (27i) of the non-contact portion (27) on the inner peripheral side is positioned closer to an outer peripheral side of the transmission belt (10) than a boundary (25i) between the rocking edge portion (25) and the inclined surface (21s) or is positioned on the boundary (25i). In this way, it is possible to make sure that the transmission belt element is in contact with the adjacent element only at the rocking edge portion that is positioned on both sides across the non-contact portion. It is also possible to satisfactorily suppress the transmission belt element from being formed thinner by making the non-contact portion shallower.

The end portion (25i) of the rocking edge portion (25) on the inner peripheral side may be positioned on the inner peripheral side relative to the saddle surface (23s). An end portion (25o) of the rocking edge portion (25) on the outer peripheral side may be positioned on an outer peripheral side of the transmission belt (10) relative to the saddle surface (23s).

The contact line (25cmin) when the winding radius is minimized may be positioned on the inner peripheral side relative to the saddle surface (23s). The contact line (25cmax) when the winding radius is maximized may be positioned on the outer peripheral side of the transmission belt (10) relative to the saddle surface (23s). In this way, it is possible to make the non-contact portion shallower and further shorten the distance between the saddle surface and the contact line of the elements in the radial direction of the transmission belt while a torque is being transmitted. It is therefore possible to decrease the angular velocity difference between the ring and the transmission belt element and satisfactorily decrease the frictional loss resulting from a relative slip between the ring and the transmission belt element.

The non-contact portion (27) may be formed so that a depth of both end portions in the width direction is gradually decreased as the non-contact portion (27) narrows toward the rocking edge portion (25) and a portion between the end portions has a constant depth (d). The depth of the non-contact portion (27) may be the constant depth (d). In this way, it is possible to suppress stress concentration near both end portions of the non-contact portion in the width direction and further improve the durability of the transmission belt element.

A width (w) of the portion that has the constant depth (d) of the non-contact portion (27) may be narrower than a width of the ring (12).

The transmission belt element (20) may further include a pair of hook portions (22f) each of which protrudes from a free end portion of the pillar portion (22) in the width direction so that the hook portions (22f) face each other. A retainer ring (15) may be disposed between the ring (12) and the hook portions (22f). With the retainer ring, it is thus possible to restrict the transmission belt element from falling out of the ring and restrict the ring from falling out of the transmission belt elements.

A transmission belt of the disclosure is a transmission belt (10) that is wound around a primary pulley (3) and a secondary pulley (5) of a continuously variable transmission (1), the transmission belt (10) comprising: a plurality of elements (20) each including a trunk portion (21) having a saddle surface (23s), and a pair of pillar portions (22) extending from the trunk portion (21) so as to be positioned on both sides of the saddle surface (23s) in a width direction; and a ring (12) disposed between the pillar portions (22) of the elements (20) so as to be in contact with the saddle surfaces (23s), wherein each of the elements (20) include: a rocking edge portion (25) with a convex surface that is formed on one of a front face and a rear face, so that the rocking edge portion (25) is extended over the pillar portion (22) at least partially, the rocking edge portion (25) having a contact line on which the adjacent elements (20) contact with each other and which serves as a fulcrum of rotation of the adjacent elements (20); and a non-contact portion (27) that is a recessed portion extended along the saddle surface (23s) in the width direction, so as not to be in contact with the adjacent element (20), and that divides the rocking edge portion (25) in the width direction at least partially, and a depth (d) of the non-contact portion (27) is set so that an end portion (27i) of the non-contact portion (27) on an inner peripheral side of the transmission belt (10) is positioned on the inner peripheral side relative to the contact line (25cmin) when a winding radius of the transmission belt (10) is minimized, and so that the end portion (27i) does not reach an edge portion (21ei) of the trunk portion (21) on the inner peripheral side.

With the transmission belt of the disclosure, the element can be suppressed from being formed thin. It is thus possible to make sure that the element is in contact with the adjacent element only at the rocking edge portion that is positioned on both sides across the non-contact portion. It is also possible to sufficiently ensure the strength of the element and suppress deformation of the element while a torque is being transmitted. As a result, the durability of the transmission belt of the disclosure can be further improved.

It should be understood that the invention of the present disclosure is not limited in any way to the above embodiments, and various modifications can be made within the spirit and scope of the present disclosure. Furthermore, the embodiments described above are merely specific forms of the invention described in the "SUMMARY OF THE DISCLOSURE" section, and do not limit the elements of the invention described in the "SUMMARY OF THE DISCLOSURE" section.

INDUSTRIAL APPLICABILITY

The disclosure is applicable to the manufacturing industry of continuously variable transmissions and transmission belts, etc.

The invention claimed is:

1. A transmission belt element comprising:
a trunk portion having a saddle surface that is in contact with a ring of a transmission belt that is wound around a primary pulley and a secondary pulley of a continuously variable transmission; and
a pair of pillar portions extending from the trunk portion so as to be positioned on both sides of the saddle surface in a width direction, wherein
the transmission belt element includes:
a rocking edge portion with a convex surface that is formed on one of a front face and a rear face, so that the rocking edge portion is extended over the pair of pillar portions at least partially, the rocking edge portion having a contact line on which adjacent elements contact with each other and which serves as a fulcrum of rotation of an adjacent element; and
a non-contact portion that is a recessed portion extended along the saddle surface in the width direction, so as not to be in contact with the adjacent element, and that divides the rocking edge portion in the width direction at least partially, and a depth of the non-contact portion is set so that an end portion of the non-contact portion on an inner peripheral side of the transmission belt is positioned on the inner peripheral side relative to a contact line of the rocking edge portion when a winding radius of the transmission belt is minimized, and so that the end portion does not reach an edge portion of the trunk portion on the inner peripheral side, wherein the one of the front face and the rear face includes an inclined surface that is continuous with the rocking edge portion on the inner peripheral side relative to the contact line when the winding radius is minimized, and that narrows toward the other one of the front face and the rear face as the inclined surface extends toward the inner peripheral side from the rocking edge portion, and the depth of the non-contact portion is set so that the end portion of the non-contact portion on the inner peripheral side is positioned closer to an outer peripheral side of the transmission belt than a boundary between the rocking edge portion and the inclined surface.

2. The transmission belt element according to claim 1, wherein an end portion of the rocking edge portion on the inner peripheral side is positioned on the inner peripheral side relative to the saddle surface and an end portion of the rocking edge portion on an outer peripheral side of the transmission belt is positioned on the outer peripheral side relative to the saddle surface.

3. The transmission belt element according to claim 1, wherein the contact line when the winding radius is minimized is positioned on the inner peripheral side of the transmission belt relative to the saddle surface and a contact line when the winding radius is maximized is positioned on an outer peripheral side of the transmission belt relative to the saddle surface.

4. The transmission belt element according to claim 1, wherein
the transmission belt element further includes a pair of hook portions each of which protrudes from a free end portion of each corresponding pillar portion in the width direction so that the pair of hook portions face each other, and
a retainer ring is disposed between the ring and the pair of hook portions.

5. The transmission belt element according to claim 1, wherein the non-contact portion is formed so that a depth of both end portions in the width direction is gradually decreased as the non-contact portion narrows toward the rocking edge portion and a portion between the end portions has a constant depth.

6. The transmission belt element according to claim 5, wherein a width of the portion that has the constant depth of the non-contact portion is narrower than a width of the ring.

7. A transmission belt that is wound around a primary pulley and a secondary pulley of a continuously variable transmission, the transmission belt comprising:

a plurality of elements each including a trunk portion having a saddle surface, and a pair of pillar portions extending from the trunk portion so as to be positioned on both sides of the saddle surface in a width direction; and a ring disposed between the pair of pillar portions of the plurality of elements so as to be in contact with the saddle surfaces, wherein each of the plurality of elements include:

a rocking edge portion with a convex surface that is formed on one of a front face and a rear face, so that the rocking edge portion is extended over the pair of pillar portions at least partially, the rocking edge portion having a contact line on which adjacent elements contact with each other and which serves as a fulcrum of rotation of an adjacent element; and a non-contact portion that is a recessed portion extended along the saddle surface in the width direction, so as not to be in contact with the adjacent element, and that divides the rocking edge portion in the width direction at least partially, and a depth of the non-contact portion is set so that an end portion of the non-contact portion on an inner peripheral side of the transmission belt is positioned on the inner peripheral side relative to a contact line of the rocking edge portion when a winding radius of the transmission belt is minimized, and so that the end portion does not reach an edge portion of the trunk portion on the inner peripheral side, wherein the one of the front face and the rear face includes an inclined surface that is continuous with the rocking edge portion on the inner peripheral side relative to the contact line when the winding radius is minimized, and that narrows toward the other one of the front face and the rear face as the inclined surface extends toward the inner peripheral side from the rocking edge portion, and the depth of the non-contact portion is set so that the end portion of the non-contact portion on the inner peripheral side is positioned closer to an outer peripheral side of the transmission belt than a boundary between the rocking edge portion and the inclined surface.

* * * * *